(12) United States Patent
Villanueva Berindoague et al.

(10) Patent No.: US 12,240,000 B2
(45) Date of Patent: Mar. 4, 2025

(54) IRON CHELATORS AS ACTIVATORS IN ALKALINE FLOTATION CIRCUITS

(71) Applicant: BASF SE, Ludwigshafen am Rein (DE)

(72) Inventors: Adrian Mauricio Villanueva Berindoague, Ludwigshafen (DE); Dale Barron, Aukland (NZ); Daniel Chipfunhu, Kwinana (AU); Alexej Michailovski, Ludwigshafen (DE); Scott Alexander Dickie, Auckland (NZ); Marta Reinoso Garcia, Ludwigshafen (DE); Deris Prawira, Jakarta (ID)

(73) Assignee: BASF SE, Ludwigshafen am Rein (DE)

( * ) Notice: Subject to any disclaimer, the term of this patent is extended or adjusted under 35 U.S.C. 154(b) by 854 days.

(21) Appl. No.: 17/256,710

(22) PCT Filed: Jul. 3, 2019

(86) PCT No.: PCT/EP2019/067895
§ 371 (c)(1),
(2) Date: Dec. 29, 2020

(87) PCT Pub. No.: WO2020/007935
PCT Pub. Date: Jan. 9, 2020

(65) Prior Publication Data
US 2021/0260603 A1    Aug. 26, 2021

(30) Foreign Application Priority Data
Jul. 4, 2018    (WO) ................ PCT/EP2018/068102

(51) Int. Cl.
| | | |
|---|---|---|
| *B03D 1/016* | (2006.01) | |
| *C02F 1/24* | (2023.01) | |
| *C02F 1/52* | (2023.01) | |
| *C22B 11/00* | (2006.01) | |
| *C02F 1/54* | (2023.01) | |
| *C02F 103/10* | (2006.01) | |
| *C22B 3/20* | (2006.01) | |
| *C22B 15/00* | (2006.01) | |

(52) U.S. Cl.
CPC ................ *B03D 1/016* (2013.01); *C02F 1/24* (2013.01); *C02F 1/5272* (2013.01); *C22B 11/042* (2013.01); *B03D 2201/007* (2013.01); *B03D 2203/025* (2013.01); *C02F 1/54* (2013.01); *C02F 2103/10* (2013.01); *C22B 3/20* (2013.01); *C22B 15/0089* (2013.01)

(58) Field of Classification Search
CPC .............. B03D 1/016; B03D 2201/007; B03D 2203/025; B03D 1/01; Y02P 10/20
See application file for complete search history.

(56) References Cited

U.S. PATENT DOCUMENTS

| | | | |
|---|---|---|---|
| 3,344,083 A | 9/1967 | Dickson et al. | |
| 3,425,549 A * | 2/1969 | Dickson ................... | D06L 1/04 209/166 |
| 2007/0012630 A1* | 1/2007 | Wright ..................... | B03D 3/06 210/704 |
| 2013/0161239 A1* | 6/2013 | Gane ....................... | B03D 1/12 209/166 |
| 2018/0036743 A1* | 2/2018 | Wilson ..................... | B03D 1/01 |

FOREIGN PATENT DOCUMENTS

| | | | | |
|---|---|---|---|---|
| AU | 2012 203 702 | | 7/2012 | |
| AU | 2012203702 A1 * | | 7/2012 | ............ B03D 1/008 |
| GB | 1015612 A * | | 7/1962 | |
| GB | 1 015 612 | | 1/1966 | |
| IE | 42614 B1 * | | 9/1980 | ............... B03D 1/02 |
| WO | 2011/114303 | | 9/2011 | |
| WO | WO-2011114303 A1 * | | 9/2011 | ............... B03B 1/00 |
| WO | WO-2018026796 A1 * | | 2/2018 | ............. B03D 1/002 |

OTHER PUBLICATIONS

G. Small, A. Michelmore, and S Grano, Size dependent gold deportment in the products of copper flotation and methods to increase gold recovery, Nov. 2003, The Journal of the South African Institute of Mining and Metallurgy. (Year: 2003).*

International Search Report for International Application No. PCT/EP2019/067895 mailed Jul. 31, 2019, 6 pgs.

Small, et al., "Size dependent gold deportment in the products of copper flotation and methods to increase gold recover," The Journal of the South African Institute of Mining and Metallurgy, Nov. 2003, pp. 573-579, vol. 103, No. 9.

* cited by examiner

*Primary Examiner* — Clare M Perrin
(74) *Attorney, Agent, or Firm* — Faegre Drinker Biddle & Reath LLP

(57) ABSTRACT

The present invention is directed to a method for selectively recovering a mineral from an ore applying a promoter being a substituted ethylene diamine. Further, the present invention is directed to the use of said substituted polymeric alkylenediamine to separate a target mineral from an ore.

11 Claims, No Drawings

IRON CHELATORS AS ACTIVATORS IN ALKALINE FLOTATION CIRCUITS

The present invention is directed to a method for selectively recovering a mineral from an ore applying a promoter being a substituted ethylene diamine. Further, the present invention is directed to the use of said substituted polymeric alkylene diamine to separate a target mineral from an ore.

Beneficiation or upgrade of ores is normally achieved by the industrial application of the froth flotation process wherein valuable metal compounds contained in the ore are separated from gangue and low valuable compounds present in the starting material via selective hydrophobization.

Froth flotation is one of the most widely used separation processes for the upgrading of ores. With the steady depletion of high grade ores which are easily processable, the exploitation of low grade, more complex and disseminated ore reserves has become necessary. This has forced the mineral processing industry to adopt more sophisticated and innovative separation technologies for concentrating valuable minerals. In terms of flotation, the development of reagents which improve the selectivity of the froth flotation process is critical to its success in treating these low grade, difficult-to-process ores.

Selectivity in froth flotation is controlled by the selective adsorption of reagents on minerals at the mineral/water interface. For example, reagents that impart sufficient hydrophobic character to minerals on adsorption such that they are rendered floatable are referred to as collectors. The finely ground ore is normally treated with thiol reagents such as xanthates, dithiophosphatates or thionocarbamates which induce hydrophobization in the target mineral phases.

In the field of gold mining, it is desired to separate copper sulphides and gold from iron sulphides and gangue minerals. This process requires that the pH value of the slurry is adjusted in such manner to allow a selective separation between particles of economical interest and the remaining part of the ore. In particular, it has turned out that the separation process is most effective when the pH value of the slurry is in the alkaline range.

When the flotation process is carried out in a slurry with alkaline pH, however, dissolution and precipitation of iron contained in the grinding media takes place. The majority of said iron is precipitated as hydroxides which are produced onto the surface of gold particles during the subsequent flotation process. The gold particles covered with iron hydroxides are rendered non-floatable and, therefore, cannot be separated from the waste stream. Further, the iron hydroxides retard the adsorption of xanthate collectors onto sulphide surfaces. Hence, the presence of iron hydroxides caused by the alkaline pH of the slurry leads to a significant loss of gold particles within the flotation process.

The application of chelating agents in froth flotation processes is well known in the art. In WO 2018/026796 A1, a method for separating silicon gangue from an iron ore is described wherein a chelating agent being a coordinating ligand such as ethylenediamine tetraacetic acid (EDTA) or a polymer comprising sulfonic acid- or carboxylic acid monomers is applied. US 2007/0012630 A1 describes the application of amine-aldehyde resins as depressants for the selective separation of solids and ionic species such as metal cations from aqueous media wherein chelating agents such as hydroxyethylenediamine triacetic acid (HEDTA), diethylene-triamine pentaacetic acid (DTPA), ethylenediamine tetraacetic acid (EDTA) or diethyltriamine pentaacetic acid (DTPA) may be added in order to enhance the separation process.

However, there is a need in the art for a method for the selective separation of valuable metals, especially gold, from ores which require a flotation process at an alkaline pH.

Thus, it is an object of the present invention to provide a method for the selective separation of valuable metals, especially gold, from ores wherein said valuable metal compounds are recovered in high amounts at an alkaline pH.

The foregoing and other objects are solved by the subject-matter of the present invention.

According to a first aspect of the present invention, a method for selectively recovering a mineral from an ore, comprising the steps of
i) grinding the ore,
ii) preparing a pulp of the ground ore obtained in step i),
iii) adding at least one promoter comprising at least one substituted polymeric alkylene diamine to the pulp obtained in step ii),
iv) subjecting the pulp containing the at least one promoter obtained in step iii) to froth flotation
is provided.

It was surprisingly found out by the inventors that substituted polymeric alkylene diamines represent iron chelators with high chelating power and selectivity towards iron(III)-compounds at an alkaline pH. Thus, said substituted ethylene diamines are useful to selectively remove the iron deposits from gold particles making them prone to flotation again whereupon the recovery of gold particles is improved significantly.

According to a further aspect of the present invention, the pH value of the pulp is adjusted to a range of 8.0 to 12.0.

According to another aspect of the present invention, the concentration of the at least one promoter within the pulp is in the range of 5 to 250 g/t.

According to another aspect of the present invention, the at least one substituted polymeric alkylene diamine is of formula (I)

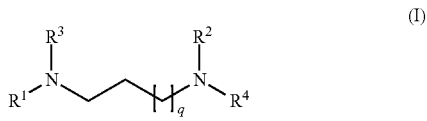

wherein
$R^1$ and $R^2$ are independently from each other a polyalkyleneimine moiety B or a salt thereof comprising at least one pendant group Z,
$R^3$ and $R^4$ are independently from each other a pendant group Z,
Z is an alkyl, heteroalkyl, aryl, alkylaryl or arylalkyl group comprising at least one moiety Y, and
Y is a carboxylate (—COOR$^5$), sulfonate (—SO$_3$R$^6$), sulfate (—O—SO$_3$R$^7$), phosphonate (—P(=O)(OR$^8$)(OR$^9$)), phosphate (—O—P(=O)(OR$^{10}$)(OR$^{11}$)), carboxylic acid (—COOH), sulfonic acid (—SO$_3$H), phosphonic acid (—P(=O)(OH)$_2$), phosphoric acid (—O—P(=O)(OH)$_2$) moiety, or their deprotonated forms,
$R^5$, $R^6$ and $R^7$ are independently from each other H, alkyl, aryl, alkylaryl or arylalkyl, Li, Na or K,
$R^8$ and $R^{10}$ are independently from each other alkyl, aryl, alkylaryl or arylalkyl,
$R^9$ and $R^{11}$ are independently from each other H, alkyl, aryl, alkylaryl or arylalkyl, and
q is an integer from 0 to 5.

According to a further aspect of the present invention, the pendant group Z is independently from each other the pendant group Z1

or the pendant group Z2,

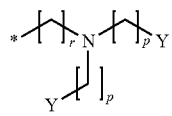

wherein
m is an integer from 1 to 15,
r is an integer from 2 to 15, and
p is an integer from 1 to 15.

It is especially preferred that the polyalkyleneimine moiety B or salt thereof is a polyethyleneimine moiety B or salt thereof.

In particular, it is preferred that the polyalkyleneimine moiety B is of formula (B)

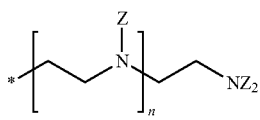

wherein Z is independently from each other Z1 or Z2 as defined above, and
n is in the range of 1 to 300.

Therefore, according to another aspect of the present invention, the at least one substituted polymeric alkylene diamine is a substituted polymeric ethylene diamine of formula (I) wherein at least one of $R^1$ or $R^2$ is

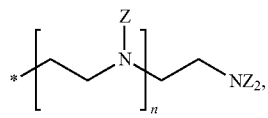

wherein Z is independently from each other Z1 or Z2 as defined above,
n is in the range of 1 to 300, more preferably in the range of 50 to 200, still more preferably in the range of 100 to 180, like in the range of 110 to 160,
q is 0 and
$R^3$ and $R^4$ have the same meaning as Z.

According to one aspect of the present invention, Y is a carboxylate (—$COOR^5$).

It is especially preferred that the substituents $R^5$ are independently from each other H, Li, Na or K.

According to a further aspect of the present invention, the pendant group Z is independently from each other the pendant group Z1'

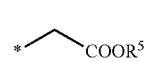

or the pendant group Z2',

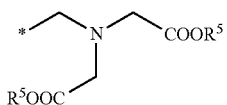

wherein the substituents $R^5$ are independently from each other H, Li, Na or K.

Preferably, the substituents $R^5$ are independently from each other H or Na.

It is especially preferred that 90 to 100 mol-% of the substituents $R^5$ are Na.

According to another aspect of the present invention, the at least one substituted polymeric alkylene diamine is a substituted polymeric ethylene diamine of formula (IIb)

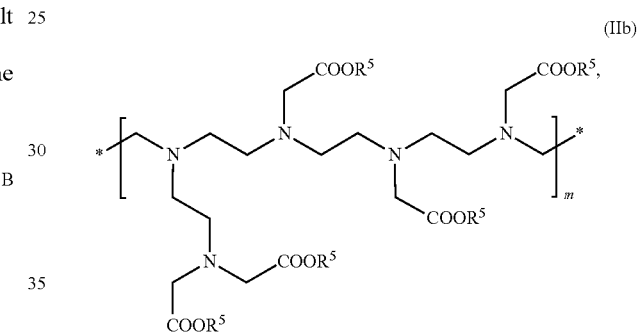

wherein the substituents $R^5$ are independently from each other H or Na and 90 to 100 mol-% of the substituents $R^5$ are Na.

According to another aspect of the present invention, the pulp further comprises at least one collector.

Preferably, the collector is selected from the group consisting of xanthates, dithiophosphates, thionocarbamates, dithiocarbamates, xantoformiates, xanthate esters, dithiophosphates, monothiophosphates, dithiophosphinates, hydroxamic acids and their alkali metal or ammonium salts, alkyl-, alkenyl- and arylphosphonic acids and salts thereof, phosphoric acid mono- and diesters with long chain alcohols or alcoxylated alcohols and salts thereof, mixtures of the collectors mentioned above with fatty acids and their salts, or mixtures thereof.

According to still another aspect of the present invention, the pulp further comprises at least one frother.

According to one aspect of the present invention, the ore comprises gold, copper and/or iron.

The present invention is further directed to the use of a promoter as defined above to separate a target mineral from an ore.

It is especially preferred that the target mineral contains gold or copper.

In the following, the present invention is described in more detail.

According to a first aspect of the present invention, a method for selectively recovering a mineral from an ore, comprising the steps of i) grinding the ore,
ii) preparing a pulp of the ground ore obtained in step i),
iii) adding at least one promoter comprising at least one substituted polymeric alkylene diamine to the pulp obtained in step ii),
iv) subjecting the pulp containing the at least one promoter obtained in step iii) to froth flotation
is provided.

The ore is preferably a sulfide containing ore comprising metal sulfides like copper, molybdenum, zinc, lead, silver, gold, nickel, ruthenium, osmium, rhodium, iridium, palladium and/or platinum-containing minerals. In particular, it is preferred that the ore comprises gold and sulphides of copper.

The ore may further comprise iron- and/or silica-containing gangue.

According to step i) of the inventive method, the ore is subjected to a grinding process in accordance with conventional procedures to achieve an economical degree of liberation to allow an efficient separation of the valuable minerals from the gangue materials.

The grinded ore is subsequently mixed with water to form a pulp. The pulp preferably has a solid content between 15 wt.-% to 40 wt.-%, more preferably at least 25 wt.-%, still more preferably at least 30 wt.-%.

Prior to mineral recovery, it is preferred that the pH value is adjusted to a predetermined value where flotation selectivity of the target metal is at a maximum.

Preferably, the pH value of the pulp is adjusted to a range of 8.0 to 12.0, more preferably to a range of 9.0 to 11.0, still more preferably to a range of 9.6 to 10.7.

The pH value is preferably adjusted by adding a pH modifier such as NaOH or CaO to the ore during the grinding process or directly to the pulp.

According to step iii) of the inventive process, at least one promoter comprising at least one substituted polymeric ethylene diamine to the pulp.

Preferably, the at least one promoter is present in the pulp in concentrations of 5 to 250 g/t, more preferably 8 to 150 g/t, still more preferably 9 to 120 g/t, yet more preferably 10 to 115 g/t, like 11 to 100 g/t.

Preferably, said at least one substituted polymeric alkylene diamine is a compound of formula (I)

wherein
$R^1$ and $R^2$ are independently from each other a polyalkyleneimine moiety B or a salt thereof comprising at least one pendant group Z,
$R^3$ and $R^4$ are independently from each other a pendant group Z,
Z is an alkyl, heteroalkyl, aryl, alkylaryl or arylalkyl group comprising at least one moiety Y, and
Y is a carboxylate ($-COOR^5$), sulfonate ($-SO_3R^6$), sulfate ($-O-SO_3R^7$), phosphonate ($-P(=O)(OR^8)(OR^9)$), phosphate ($-O-P(=O)(OR^{10})(OR^{11})$), carboxylic acid ($-COOH$), sulfonic acid ($-SO_3H$), phosphonic acid ($-P(=O)(OH)_2$), phosphoric acid ($-O-P(=O)(OH)_2$) moiety, or their deprotonated forms, $R^5$, $R^6$ and $R^7$ are independently from each other H, alkyl, aryl, alkylaryl or arylalkyl, Li, Na or K,
$R^8$ and $R^{10}$ are independently from each other alkyl, aryl, alkylaryl or arylalkyl,
$R^9$ and $R^{11}$ are independently from each other H, alkyl, aryl, alkylaryl or arylalkyl, and
q is an integer from 0 to 5.

Preferably, Z is an alkyl, most preferably a $C_1$ to $C_{15}$ alkyl, particularly a $C_1$ to $C_5$ alkyl, for example a methyl group comprising at least one moiety Y.

According to one embodiment, Z is the pendant group Z1 comprising one moiety Y, wherein m is an integer from 1 to 15, more preferably an integer from 1 to 5, most preferably 1.

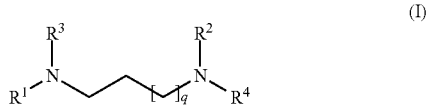

According to a further embodiment, Z is an N,N-dialkylaminoalkyl group comprising at least one moiety Y, preferably an aminoalkyl group which is N,N-disubstituted with an alkyl group comprising at least one moiety Y, more preferably a $C_2$ to $C_5$ aminoalkyl group which is N,N-disubstituted with a $C_1$ to $C_5$ alkyl group comprising the moiety Y, most preferably an aminoethyl group which is N,N-disubstituted with an methyl group comprising the moiety Y.

According to a further embodiment, Z is the pendant group Z2 comprising two moieties Y, wherein r is an integer from 2 to 15, more preferably an integer from 2 to 5, still more preferably 2, yet more preferably 1, and wherein p is an integer from 1 to 15, more preferably an integer from 1 to 5, still more preferably 1.

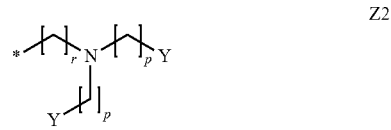

According to an especially preferred embodiment, m is 1, r is 1 and p is 1.

Generally, each type of Z comprises at least one type of moieties Y. Each type of Z comprises preferably 1 to 4 types, more preferably 1 or 2 types, most preferably 1 type of moieties Y.

In general, each pendant group Z comprises at least one moiety Y. Each pendant group Z comprises preferably 1 to 10, more preferably 1 to 4, most preferably 1 or 2 moieties Y.

Preferably, each pendant group Z is independently from each other the pendant group Z1 or the pendant group Z2.

The polyalkyleneimine moiety B is preferably a polyethyleneimine, a polypropyleneimine, a polybutyleneimine, or a salt thereof. It is especially preferred that B is a polyethyleneimine or a salt thereof.

In general, B can be homopolymers or copolymers. The latter may be alternating, periodic, statistical or block copolymers. In particular, B can be of any polymer structure, for example a linear polymer, a ring polymer, a cross-linked polymer, a branched polymer, a star polymer, a comb polymer, a brush polymer, a dendronized polymer, or a dendrimer etc. Preferably, B is an essentially linear polymer. More preferably, B is a linear polymer.

The polyalkyleneimine moiety B can have different weight average molecular weights. The weight average molecular weight of (B) is preferably at least 1,000, more preferably at least 5,000, most preferably at least 15,000, for example at least 30,000. The weight average molecular weight of (B) is preferably not more than 600,000, more preferably not more than 250,000, most preferably not more than 120,000, for example not more than 70,000. The weight average molecular weight can be determined by standard gel permeation chromatography (GPC) known to the person skilled in the art.

In general, the solubility of B in an aqueous medium can vary within a wide range. The solubility of B in water at pH 7 at 25° C. under atmospheric pressure is preferably at least 0.1 g/L, more preferably at least 0.5 g/L, most preferably at least 1 g/L, for example at least 4 g/L. Said solubility can be determined by evaporating the solvent and measuring the remaining mass in the saturated solution.

Generally, B can comprise one or more types of pendant groups Z. B comprises preferably 1 to 4 types, more preferably 1 or 2 types, most preferably 2 types of pendant groups Z.

Regarding the pendant group Z, reference is made to the definition provided above.

It is especially preferred that each pendant group Z of the polyalkyleneimine moiety B is independently from each other the pendant group Z1 or the pendant group Z2.

Preferably, B comprises at least one type of Z which is covalently bound to the nitrogen atoms on the backbone of B. More preferably, all types of Z comprised in B are covalently bound to the nitrogen atoms on the backbone of B. Most preferably, B comprises two types of Z which are covalently bound to the nitrogen atoms on the backbone of B. The backbone of B is defined as the main chain of B, i.e. that chain of B, to which all other chains, long or short or both, may be regarded as being pendant.

Generally, the percentage (% ZN) of pendant groups Z comprised in B which are covalently bound to the nitrogen atoms on the backbone of B can vary between 0% and 100%. Said percentage is referred to as (% ZN) and is preferably at least 40%, more preferably at least 60%, most preferably at least 70%, for example at least 80%. (% ZN) is preferably not more than 99%, more preferably not more than 97%, most preferably not more than 95%, for example not more than 90%.

In general, the percentage (% NZ) of nitrogen atoms on the backbone of B which are substituted with pendant group Z can vary between 0% and 100%. Said percentage is referred to as (% NZ) and is preferably at least 40%, more preferably at least 60%, most preferably at least 70%, for example at least 80%. (% NZ) is preferably not more than 99%, more preferably not more than 97%, most preferably not more than 95%, for example not more than 90%.

The percentages (% ZN) and (% NZ) can be determined using NMR techniques, for example those NMR techniques as described in EP 1 702 015 A1 for determining the degree of branching.

According to a further embodiment, B is a polyalkyleneimine or a salt thereof comprising pendant group Z1 and/or Z2, wherein
Z1 and Z2 are covalently bound to the nitrogen atoms on the polyalkyleneimine backbone,
m is an integer from 1 to 15,
r is an integer from 2 to 15,
p is an integer from 1 to 15,
q is an integer from 0 to 3, and
Y has the meaning defined above.

According to a further embodiment, B is a polyalkyleneimine or a salt thereof comprising pendant group Z1 and/or Z2, wherein
Z1 and Z2 are covalently bound to the nitrogen atoms on the polyalkyleneimine backbone,
m is an integer from 1 to 5,
r is an integer from 2 to 5,
p is an integer from 1 to 5,
q is an integer from 0 to 2, and
Y has the meaning defined above.

According to a further embodiment, B is a polyalkyleneimine or a salt thereof comprising pendant group Z1 and/or Z2, wherein
Z1 and Z2 are covalently bound to the nitrogen atoms on the polyalkyleneimine backbone,
m is an integer from 1 to 3,
r is an integer from 2 to 3,
p is an integer from 1 to 3,
q is an integer from 0 to 1, and
Y has the meaning defined above.

According to a further embodiment, B is a polyethyleneimine or a salt thereof comprising pendant group Z1 and/or Z2, wherein
Z1 and Z2 are covalently bound to the nitrogen atoms on the polyethyleneimine backbone,
m is 1
r is 1
p is 1,
q is 0 and
Y has the meaning defined above.

Preferably, the at least one substituted polymeric alkylene diamine is a substituted polymeric ethylene diamine.

Accordingly, it is preferred that B is a polyethyleneimine B1

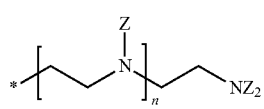

wherein Z is independently from each other Z1 or Z2 as defined above,
n is in the range of 1 to 300, more preferably in the range of 50 to 200, still more preferably in
the range of 100 to 180, like in the range of 110 to 160,
q is 0 and
Y has the meaning defined above.

Accordingly, the at least one substituted polymeric alkylene diamine is a substituted polymeric ethylene diamine of formula (Ia)

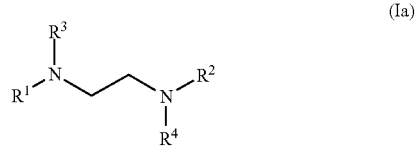

wherein
R$^1$ and R$^2$ are independently from each other

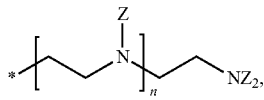

wherein Z is independently from each other Z1 or Z2 as defined above,
n is in the range of 1 to 300, more preferably in the range of 50 to 200, still more preferably in the range of 100 to 180, like in the range of 110 to 160,
R$^3$ and R$^4$ have the same meaning as Z, and
Y has the meaning defined above.

In particular, it is preferred that Y is a carboxylate (—COOR$^5$) wherein the substituents R$^5$ are independently from each other H, alkyl, aryl, alkylaryl or arylalkyl, Li, Na or K.

It is especially preferred that the substituents R$^5$ are independently from each other H, Li, Na or K.

Accordingly, it is preferred that the substituents Y represent carboxylic acid groups (—COOH) which are partially or fully neutralized with alkali metal cations. The non-neutralized groups (—COOH) can be, for example, the free acid. It is preferred that 90 to 100 mol-% of the substituents Y are in neutralized form.

Preferably, the substituents Y representing carboxylic acid groups (—COOH) are partially or fully neutralized with K or Na. It is especially preferred that the substituents Y representing carboxylic acid groups (—COOH) are partially or fully neutralized Na.

Thus, it is preferred that the substituents R$^5$ are independently from each other H or Na. In particular, it is preferred that 90 to 100 mol-% of the substituents R$^5$ are Na.

Preferably, the at least one substituted polymeric alkylene diamine is a substituted polymeric ethylene diamine of formula (II)

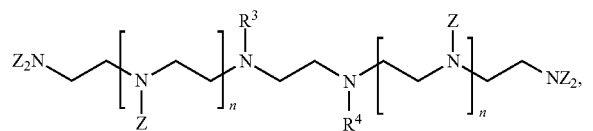

(II)

wherein Z is independently from each other

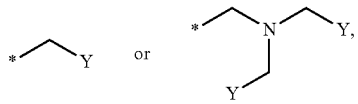

n is independently in the range of 1 to 300, more preferably in the range of 50 to 200, still more preferably in the range of 100 to 180, like in the range of 110 to 160, and
R$^3$ and R$^4$ have the same meaning as Z,
Y is a carboxylate (—COOR$^5$), sulfonate (—SO$_3$R$^6$), sulfate (—O—SO$_3$R$^7$), phosphonate (—P(=O)(OR$^8$)(OR$^9$)), phosphate (—O—P(=O)(OR$^{10}$)(OR$^{11}$)), carboxylic acid (—COOH), sulfonic acid (—SO$_3$H), phosphonic acid (—P(=O)(OH)$_2$), phosphoric acid (—O—P(=O)(OH)$_2$) moiety, or their deprotonated forms,
R$^5$, R$^6$ and R$^7$ are independently from each other H, alkyl, aryl, alkylaryl or arylalkyl, Li, Na or K,
R$^8$ and R$^{10}$ are independently from each other alkyl, aryl, alkylaryl or arylalkyl, and
R$^9$ and R$^{11}$ are independently from each other H, alkyl, aryl, alkylaryl or arylalkyl.

In particular, it is preferred that Y is a carboxylate (—COOR$^5$) wherein the substituents R$^5$ are independently from each other H, alkyl, aryl, alkylaryl or arylalkyl, Li, Na or K.

Accordingly, it is preferred that the at least one substituted polymeric alkylene diamine is a substituted polymeric ethylene diamine of formula (IIa)

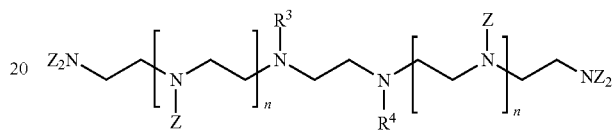

wherein Z is independently from each other

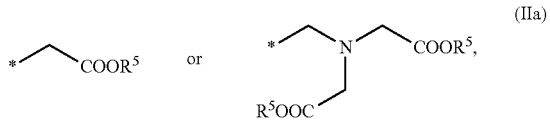

(IIa)

n is independently in the range of 1 to 300, more preferably in the range of 50 to 200, still more preferably in the range of 100 to 180, like in the range of 110 to 160,
R$^3$ and R$^4$ have the same meaning as Z,
and the substituents R$^5$ are independently from each other H, alkyl, aryl, alkylaryl or arylalkyl, Li, Na or K.

Preferably, the substituents R$^5$ are independently from each other H, Li, Na or K.

It is especially preferred that the substituents R$^5$ are independently from each other H or Na. In particular, it is preferred that 90 to 100 mol-% of the substituents R$^5$ are Na.

In particular, it is preferred that the at least one substituted polymeric alkylene diamine is a substituted polymeric ethylene diamine of formula (IIb)

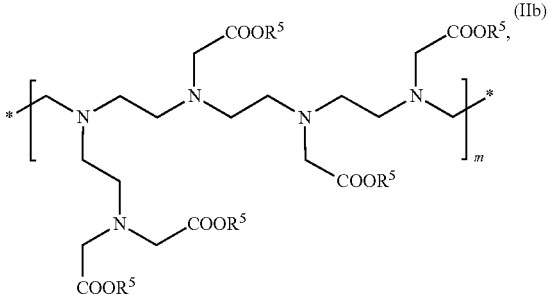

(IIb)

wherein m is in the range of 1 to 150, more preferably in the range of 30 to 130, still more preferably in the range of 80 to 120, like in the range of 90 to 110, and
the substituents R$^5$ are independently from each other H, Li, Na or K.

Preferably, the substituents R$^5$ are independently from each other H, Li, Na or K.

It is especially preferred that the substituents $R^5$ are independently from each other H or Na. In particular, it is preferred that 90 to 100 mol-% of the substituents $R^5$ are Na.

Further, it is preferred that the at least one promoter, like the at least one substituted polymeric alkylene diamine of formula (II), the at least one substituted polymeric alkylene diamine of formula (IIa) or the at least one substituted polymeric alkylene diamine of formula (IIb), is present in the pulp in concentrations of 5 to 250 g/t, more preferably 8 to 100 g/t, still more preferably 9 to 70 g/t, like 10 to 45 g/t.

Therefore, the promoter according to the present invention may comprise at least one substituted alkylene diamine selected from the group consisting of the at least one substituted alkylene diamines of formulas (I), (Ia), (II), (IIa), (IIb) as defined above or mixtures thereof. In particular, it is preferred that the promoter comprises at least 80 wt.-%, more preferably at least 90 wt.-%, still more preferably at least 99 wt.-% of the at least one substituted polymeric alkylene diamine of formula (I), (Ia), (II), (IIa), (IIb) as defined above. It is especially preferred that the promoter consists of the at least one substituted polymeric alkylene diamine of formula (I), (Ia), (II), (IIa), (IIb) as defined above.

Preferably, the promoter comprises at least one substituted ethylene diamines selected from the group consisting of the at least one substituted alkylene diamines of formulas (I), (Ia), (II), (IIa), (IIb) as defined above or mixtures thereof.

In particular, it is preferred that the promoter is at least one substituted polymeric alkylene diamine of formula (II) as defined above.

It is preferred that the at least one substituted polymeric alkylene diamine is a compound of formula (II), (IIa) or (IIb).

It is especially preferred that the at least one substituted polymeric alkylene diamine is a substituted polymeric ethylene diamine of formula (IIb)

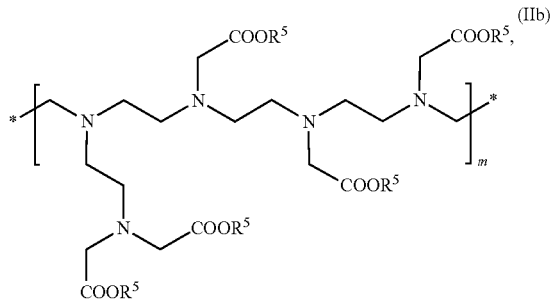

wherein m is in the range of 1 to 150, more preferably in the range of 30 to 130, still more preferably in the range of 80 to 120, like in the range of 90 to 110, and the substituents $R^5$ are independently from each other H, Li, Na or K.

It is especially preferred that $R^5$ is H or Na. More preferably, 90 to 100 mol-% of the substituents $R^5$ are Na.

Next to the promoter, a collector may be added to the pulp obtained in step ii) of the inventive method.

The collector may be any suitable collector known in the art for imparting sufficient hydrophobic character to the minerals of a sulfide containing ore comprising metal sulfides like copper, molybdenum, zinc, lead, silver, gold, nickel, ruthenium, osmium, rhodium, iridium, palladium and/or platinum-containing minerals.

Non-limiting examples for suitable collectors are xanthates, dithiophosphates, thionocarbamates, dithiocarbamates, xantoformiates, xanthate esters, dithiophosphates, monothiophosphates, dithiophosphinates, hydroxamic acids and their alkali metal or ammonium salts, alkyl-, alkenyl- and arylphosphonic acids and salts thereof, phosphoric acid mono- and diesters with long chain alcohols or alcoxylated alcohols and salts thereof, mixtures of the collectors mentioned above with fatty acids and their salts, or mixtures thereof.

The collector is preferably present in the ground ore in concentrations of 5 to 100 g/t, more preferably 10 to 50 g/t, still more preferably 12 to 30 g/t, like 15 to 25 g/t.

It may also be desirable to include a froth regulator in the system in order to improve the efficiency. Examples of convenient froth regulators include carbinol such as methyl isobutyl carbinol and alcohols having between 6 and 12 carbon atoms such as ethylhexanol and alkoxylated alcohols.

Further conventional additives may be included in the flotation system, such as pH regulating agents, co-collectors and extender oils like kerosene or diesel oil.

As outlined above, the present invention is also directed to the use of a promoter being at least one substituted polymeric alkylene diamine of formulas (I), (Ia), (II), (IIa), (IIb) as defined above a target mineral from an ore.

It is especially preferred that the target metal contains copper, molybdenum, zinc, lead, silver, gold, nickel, ruthenium, osmium, rhodium, iridium, palladium and/or platinum.

According to a particularly preferred embodiment, the target mineral contains gold or copper.

The scope and interest of the invention will be better understood based on the following examples which are intended to illustrate certain embodiments of the invention and are non-limitative.

EXAMPLES

A Quartz Crystal Microbalance with Dissipation monitoring (QCM-D) from Q-Sense, was used to demonstrate the use of inventive flotation promoters to improve the adsorption of collector onto the surface of gold previously exposed to iron salts.

Comparative example: a gold plate was contacted with Mili-Q water at pH=7 for 30 minutes. A solution of 10 mmol/L $FeCl_3$ was circulated though the QCM-D to allow deposition of Fe on the gold plate. Milli-Q water was circulated again for 30 minutes to rinse the excess salts not adsorbed onto the gold plate. A solution of 1% Diethyl dithiophosphate ammonium salt (Sigma-Aldrich, CAS 1068-22-0) at pH=11 was circulated for 60 minutes. A final rinse with Mili-Q water at pH=11 was conducted for 60 minutes. The Mass change in $ng/cm^2$ was continuously recorded during the experiment.

The inventive promoter DP-OMC-1127 is a commercially available polyethyleneimine by BASF having a molecular weight of 50,000 g/mol and a degree of substitution of 80%. DP-OMC-1127 is represented by the below formula:

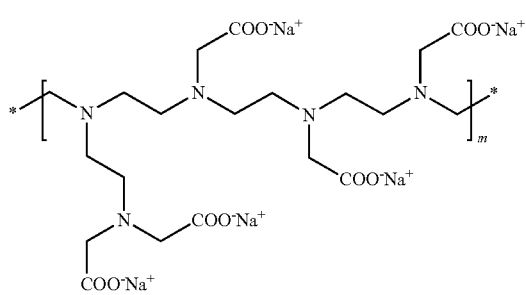

Inventive example: a gold plate was contacted with Mili-Q water at pH=7 for 30 minutes. A solution of 10 mmol/L FeCl₃ was circulated though the QCM-D to allow deposition of Fe on the gold plate. Milli-Q water was circulated again for 30 minutes to rinse the excess salts not adsorbed onto the gold plate. A solution of 1% DP-OMC-1127 (BASF) at pH=11 was circulated for 60 minutes. Milli-Q water was circulated again for 30 minutes as rinsing step for the non-adsorbed DP-OMC-1127. A solution of 1% Diethyl dithiophosphate ammonium salt (Sigma-Aldrich, CAS 1068-22-0) at pH=11 was circulated for 60 minutes. A final rinse with Mili-Q water at pH=11 was conducted for 60 minutes. The Mass change in ng/cm² was continuously recorded during the experiment.

The comparative and inventive example results are summarized in Tables 1 and 2.

TABLE 1

Comparative example results.

| | | | Mass Change [ng/cm²] | |
|---|---|---|---|---|
| Step | Solution | pH | Run 1 | Run 2 |
| 1 | Water | 7 | 0 | 0 |
| 2 | 10 mmol/L FeCl₃ | 3 | 311 | 243 |
| 3 | Water | 11 | 340 | 261 |
| 4 | 1% Dithiophosphate | 11 | 312 | 240 |
| | Mass of Dithiophosphate Adsorbed [ng] | | 1 | −3 |

TABLE 2

Inventive example results.

| | | | Mass Change [ng/cm²] | |
|---|---|---|---|---|
| Step | Solution | pH | Run 3 | Run 4 |
| 1 | Water | 7 | 0 | 0 |
| 2 | 10 mmol/L FeCl₃ | 3 | 390 | 513 |
| 3 | Water | 11 | 409 | 533 |
| 4 | 1% DP-OMC-1127 | 11 | 440 | 460 |
| 5 | Water | 11 | 445 | 371 |
| 6 | 1% Dithiophosphate | 11 | 502 | 413 |
| | Mass of Dithiophosphate Adsorbed [ng] | | 57 | 42 |

As shown in Tables 1 and 2, the application of the inventive promoter DP-OMC-1127 after the exposure of the gold surface to FeCl₃ allow the deposition of collector Diethyl dithiophosphate which was not detected in the comparative experiment without the promoter.

The results obtained showed that the addition of the inventive promoter resulted in improvement in the adsorption of collector onto gold surfaces.

The invention claimed is:

1. A method for selectively recovering a mineral from an iron comprising ore, comprising:
    i) grinding the iron comprising ore,
    ii) preparing a pulp of the ground ore obtained in step i),
    iii) adding at least one promoter comprising at least one substituted polymeric alkylene diamine as an iron chelator to the pulp obtained in step ii), wherein the at least one substituted polymeric alkylene diamine is a substituted polymeric ethylene diamine of formula (IIb)

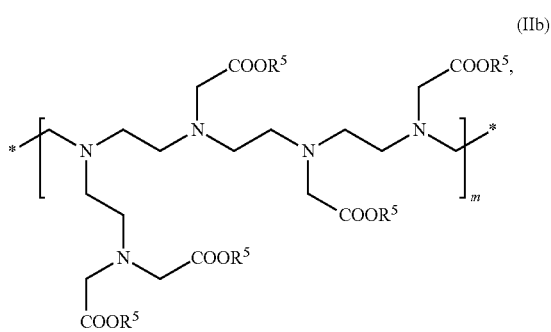

wherein m is in the range of 1 to 150, the substituents $R^5$ are independently from each other H, Li, Na or K, and
* is $Z_2N$, where Z is independently from each other

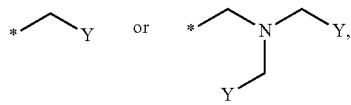

Y is a carboxylate (—COOR⁵), sulfonate (—SO₃R⁶), sulfate (—O—SO₃R⁷), phosphonate (—P(═O)(OR⁸)(OR⁹)), phosphate (—O—P(═O)(OR¹⁰)(OR¹¹)) carboxylic acid (—COOH), sulfonic acid (—SO₃H), phosphonic acid (—P(═O)(OH)₂), phosphoric acid (—O—P(═O)(OH)₂) moiety, or their deprotonated forms, $R^5$, $R^6$ and $R^7$ are independently from each other H, alkyl, aryl, alkylaryl or arylalkyl, Li, Na or K, $R^8$ and $R^{10}$ are independently from each other alkyl, aryl, alkylaryl or arylalkyl, and $R^9$ and $R^{11}$ are independently from each other H, alkyl, aryl, alkylaryl or arylalkyl; and iv) subjecting the pulp containing the at least one promoter obtained in step iii) to froth flotation.

2. The method according to claim 1, wherein pH of the pulp is adjusted to a range of 8.0 to 12.0.

3. The method according to claim 1, wherein concentration of the at least one promoter within the pulp is in the range of 5 to 250 g/t.

4. The method according to claim 1, wherein the pulp further comprises at least one collector.

5. The method according to claim 4, wherein the collector is selected from the group consisting of xanthates, dithiophosphates, thionocarbamates, dithiocarbamates, xantoformiates, xanthate esters, dithiophosphates, monothiophosphates, dithiophosphinates, hydroxamic acids and their alkali metal or ammonium salts, alkyl-, alkenyl- and arylphosphonic acids and salts thereof, phosphoric acid mono- and diesters with long chain alcohols or alcoxylated alcohols and salts thereof, mixtures of the collectors mentioned above with fatty acids and their salts, and mixtures thereof.

6. The method according to claim 1, wherein the pulp further comprises at least one frother.

7. The method according to claim 1, wherein the iron comprising ore comprises gold, copper or a combination thereof.

8. The method according to claim 1, wherein the substituents $R^5$ are independently from each other H or Na and 90 to 100 mol % of the substituents $R^5$ are Na.

9. The method according to claim 1, wherein Z is independently from each other

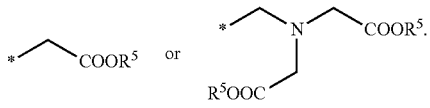

10. A method of using at least one promoter to separate a target mineral from an iron comprising ore, comprising:

i) grinding the iron comprising ore;

ii) preparing a pulp of the ground iron comprising ore;

iii) combining the pulp with at least one promoter comprising at least one substituted polymeric alkylene diamine as an iron chelator to the pulp obtained in step ii), wherein the at least one substituted polymeric alkylene diamine is a substituted polymeric ethylene diamine of formula (IIb)

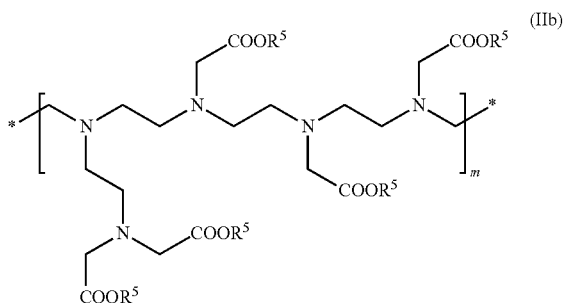

wherein, m is in the range of 1 to 150, the substituents $R^5$ are independently from each other H, Li, Na or K and * is $Z_2N$, where Z is independently from each other

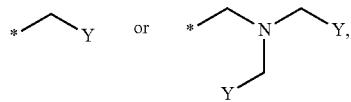

Y is a carboxylate (—$COOR^5$), sulfonate (—$SO_3R^6$), sulfate (—O—$SO_3R^7$), phosphonate (—P(=O)($OR^8$)($OR^9$)), phosphate (—O—P(=O)($OR^{10}$)($OR^{11}$)), carboxylic acid (—COOH), sulfonic acid (—$SO_3H$), phosphonic acid (—P(=O)$(OH)_2$), phosphoric acid (—O—P(=O)$(OH)_2$) moiety, or their deprotonated forms, $R^5$, $R^6$ and $R^7$ are independently from each other H, alkyl, aryl, alkylaryl or arylalkyl, Li, Na or K, $R^8$ and $R^{10}$ are independently from each other alkyl, aryl, alkylaryl or arylalkyl, and $R^9$ and $R^{11}$ are independently from each other H, alkyl, aryl, alkylaryl or arylalkyl; and iv) subjecting the pulp containing the at least one promoter to froth flotation to separate the target mineral from the ore.

11. The method according to claim 10, wherein the target mineral contains gold or copper.

* * * * *